United States Patent [19]
Farooque et al.

[11] Patent Number: 5,660,941
[45] Date of Patent: Aug. 26, 1997

[54] CATALYST ASSEMBLY FOR INTERNAL REFORMING FUEL CELL

[75] Inventors: Mohammad Farooque, Huntington; Pinakin S. Patel, Danbury; Jeffrey Allen, Naugatuck, all of Conn.

[73] Assignee: Energy Research Corporation, Danbury, Conn.

[21] Appl. No.: 667,980

[22] Filed: Jun. 19, 1996

[51] Int. Cl.$^6$ ................................................... H01M 8/18
[52] U.S. Cl. ........................... 429/19; 429/20; 429/34; 429/41
[58] Field of Search ........................... 429/19, 20, 30, 429/34, 40, 41

[56] References Cited

U.S. PATENT DOCUMENTS

| | | | |
|---|---|---|---|
| 3,909,299 | 9/1975 | Corrigan | 136/86 C |
| 4,182,795 | 1/1980 | Baker et al. | 429/13 |
| 4,774,152 | 9/1988 | Farooque et al. | 429/12 |
| 4,788,110 | 11/1988 | Bernard | 429/19 |
| 4,877,693 | 10/1989 | Baker | 429/19 |

*Primary Examiner*—M. Nuzzolillo
*Attorney, Agent, or Firm*—Robin, Blecker, Daley & Driscoll

[57] ABSTRACT

A catalyst assembly for placement in the anode compartment of an internally reforming fuel cell. The anode compartment includes a current collector having peak regions with spacer regions therebetween. The catalyst assembly is in the form of a member including a catalyst material and having through openings in the member of distribution and configuration so that the member can be inserted over the current collector with the peak regions being received in the through openings and holding the member.

28 Claims, 6 Drawing Sheets

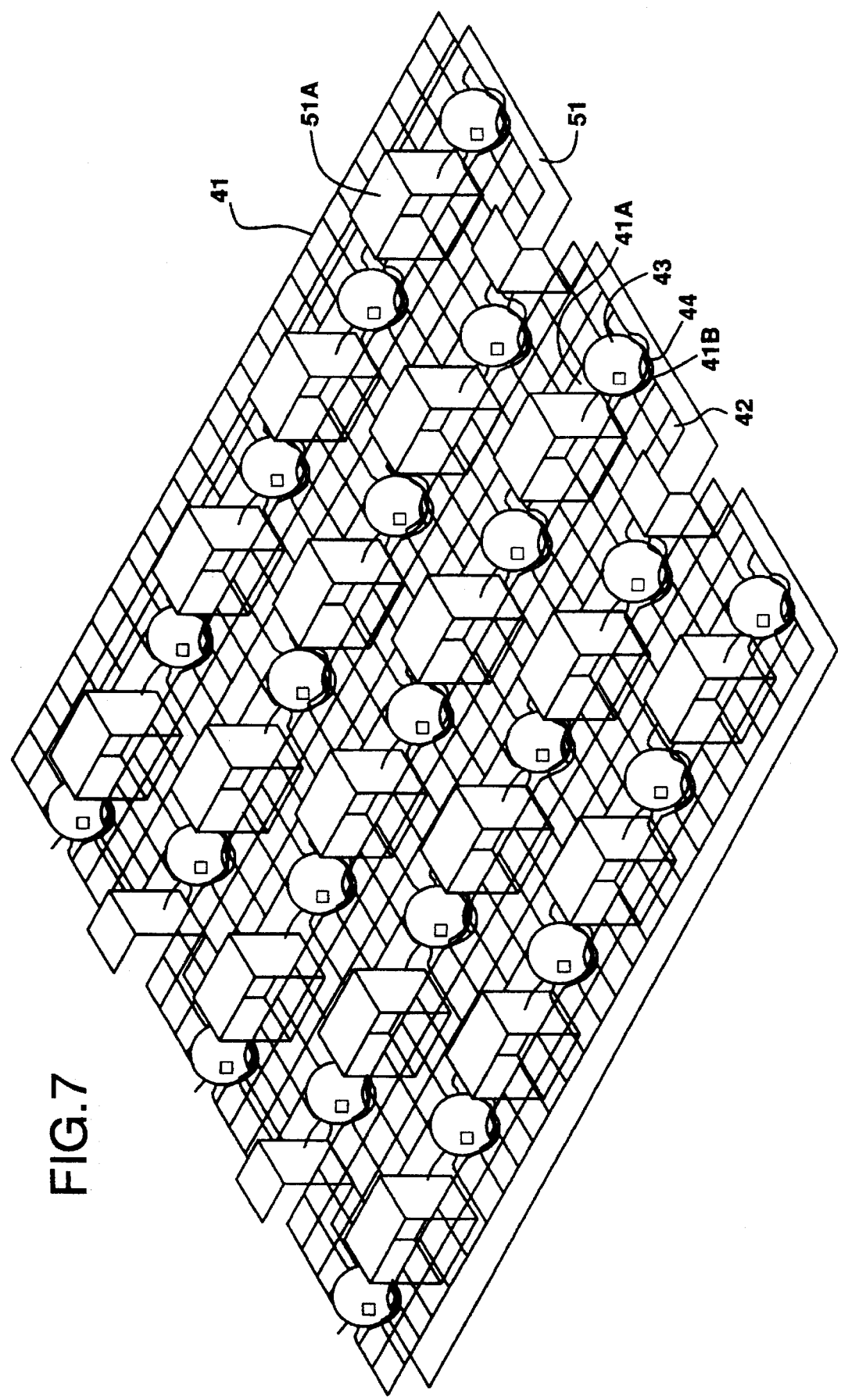

CATALYST ASSEMBLY FOR INTERNAL REFORMING FUEL CELL

BACKGROUND OF THE INVENTION

This invention relates to fuel cells and, in particular, to improvements in the catalyst used in internal reforming fuel cells.

The fuel cell is emerging as a viable device for efficiently converting chemical energy of a fuel directly to electrical energy. In a fuel cell, energy conversion is accomplished via electrochemical reactions involving a fuel and an oxidant taking place within the fuel cell. Although the fuel cell is an efficient converter of chemical energy to direct electrical power, the part of the fuel energy which is not converted to electricity in the fuel cell is available as heat. This by-product heat is removed to achieve isothermal operation. Water is another by-product of the fuel cell reactions.

The fuel used in practical and commercially viable fuel cells is hydrogen. Hydrogen is produced by steam reforming of a hydrocarbon fuel in an endothermic reforming reaction. Therefore, it requires a supply of both water and heat from an external source. In a conventional fuel cell power plant, an external reformer is used (see, e.g., U.S. Pat. No. 3,909,299) to produce hydrogen for the fuel cell. To improve overall efficiency of energy conversion, the fuel cell by-product heat is utilized in the reformer. This requires heat exchange equipment and hot piping.

Because the fuel cell reaction produces water and heat and the reforming reaction consumes water and heat, a technique for combining both of these reactions within the fuel cell, called internal reforming, has been proposed (see, e.g., U.S. Pat. Nos. 4,182,795 and 4,877,693). In the internal reforming fuel cell, the reforming reaction is carried out in situ in the fuel cell anode compartment so that the fuel cell produced water and heat is directly available at the reforming reaction site. This requires that the fuel cell anode compartment be loaded with an appropriate reforming catalyst.

The fuel cell anode compartment is usually a planar structure. This structure typically comprises a separator plate for isolating fuel from the neighboring cell oxidant stream, an anode for providing fuel cell reaction sites, and a current collector for conducting of electrons from the anode to the cathode of a next neighboring cell and for providing a flow path for the gaseous fuel stream.

As indicated above, the anode compartment of the internally reforming fuel cell is loaded with the reforming catalyst. Various methods for loading reforming catalyst in the fuel cell anode compartment have been used (see, e.g., U.S. Pat. No. 4,788,110). The reforming catalysts are usually available in different shapes such as tablet, pellet, rod, ring and spherical. In the conventional methods, the reforming catalyst of the pellet and/or the tablet shape are loaded into the pockets of the corrugated current collector.

The aforesaid catalyst loading methods suffer from several drawbacks. Uniform loading of the catalysts in the direction normal to the gas flow as well as in the direction of the gas flow is difficult to achieve resulting in fuel flow maldistribution, in the fuel cell. Handling of small catalyst particles during assembly is cumbersome and is difficult to automate and, therefore, is not cost effective. Also, cell-to-cell loading uniformity is difficult to achieve and catalyst shifting and spilling during assembly, handling, transportation, and during operation may be difficult to avoid.

Furthermore, it is important that any contact between the catalyst and the anode be avoided during operation to prevent catalyst deactivation by electrolyte adsorption. In the most advanced designs to date, this has been achieved only if the fuel cells are situated vertically. Angular or the horizontal positions are not permitted because the catalyst particles in an inclined cell will shift and/or may come in contact with the anode and adsorb electrolyte resulting in deactivation and loss of reforming activity.

It is, therefore, an object of the present invention to provide a catalyst assembly for an internal reforming fuel cell which avoids these disadvantages.

It is a further object of the present invention to provide a catalyst assembly for an internal reforming fuel cell in which the catalyst assembly is easily assembled in the fuel cell.

It is yet a further object of the present invention to provide a catalyst assembly for an internal reforming fuel cell in which the catalyst assembly has minimum displacement and permits vertical and horizontal orientations of the fuel cell.

SUMMARY OF THE INVENTION

In accordance with the principles of the present invention, the above and other objectives are realized in a catalyst assembly comprised of a member including a catalyst material and having through openings in the member which have a configuration and distribution so that they align with the peak regions of the current collector of the fuel cell. These openings thus permit the catalyst member to be inserted over the peak regions of the current collector and to be held in the fuel cell by the peak regions engaging the openings.

The fuel cell can thus be oriented as desired without shifting or movement of the catalyst plate member and without concern that the catalyst plate member will come into contact with the anode so as to deactivate the catalyst. Additionally, the catalyst distribution in the fuel cell is more uniform and assembly of the catalyst in the cell is simplified.

In one embodiment of the invention, the catalyst member is a plate member which has been catalyzed or formed with a catalyst material and which has been provided with the desired openings. In further embodiments of the invention, the catalyst member takes the form of an expanded metal or a wire screen which supports catalyst pellets. Certain of the openings in the expanded metal or wire screen are enlarged to provide the catalyst member openings and certain other of the openings in the expanded metal or wire screen are reduced to provide support for the catalyst pellets.

BRIEF DESCRIPTION OF THE DRAWINGS

The above and other features and aspects of the present invention will become more apparent upon reading the following detailed description in conjunction with the following drawings, in which:

FIGS. 4–7 show further embodiments of the catalyst member of the invention.

DETAILED DESCRIPTION

Figure 1:
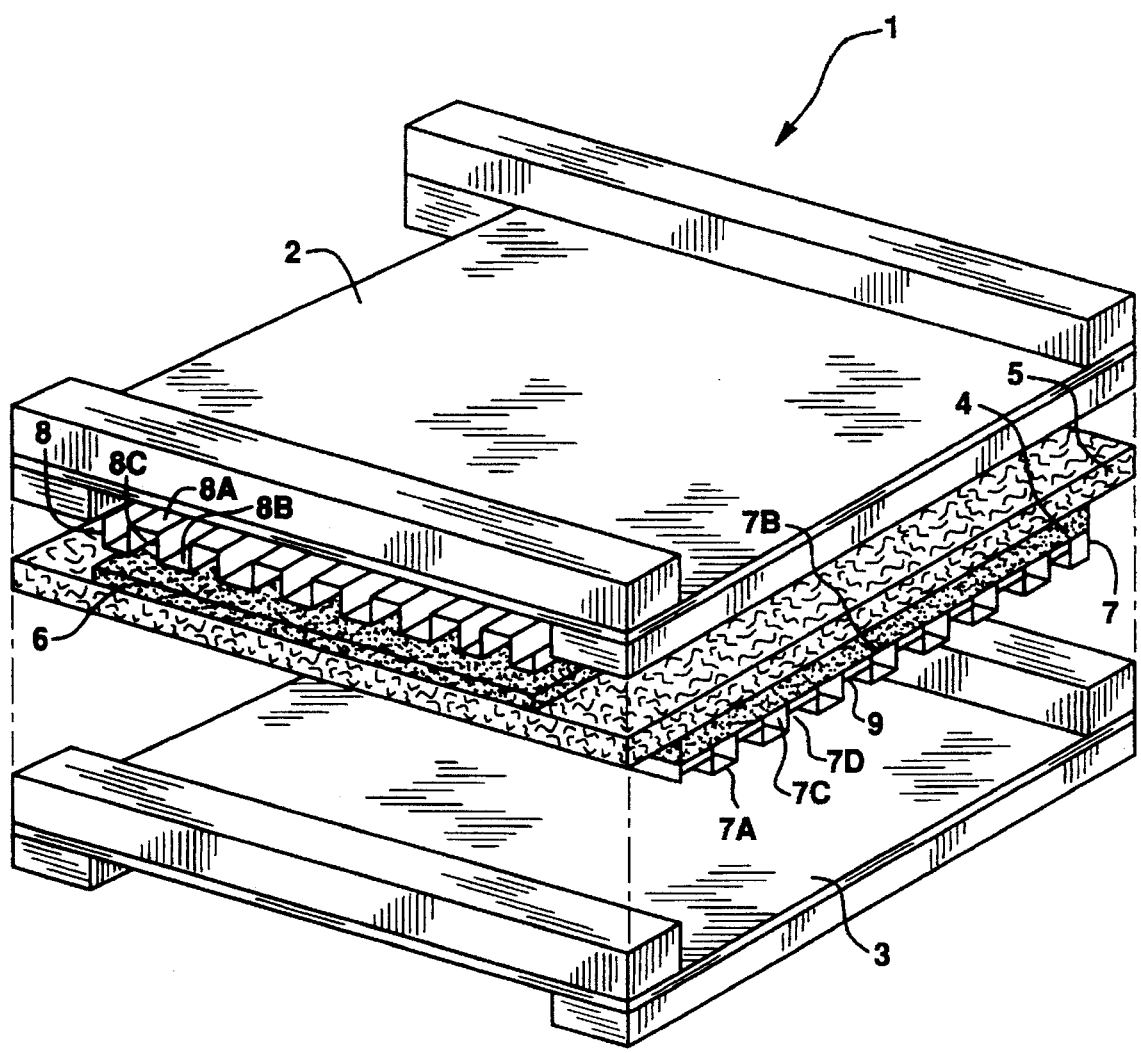
FIG. 1 shows an internal reforming fuel cell including a catalyst member in accordance with the principles of the present invention.

FIG. 1 shows an internal reforming fuel cell 1 having a catalyst member in accordance with the principles of the present invention. The fuel cell 1 is of planar configuration and comprises upper and lower separator plate assemblies 2 and 3. These plate assemblies sandwich an anode electrode 4, an electrolyte matrix 5 and a cathode electrode 6. The electrodes 4 and 6 abut current collector plates 7 and 8, respectively, each having peak regions 7A, 8A and spacer regions therebetween 7B, 8B. The anode and cathode channels 7C, 8C defined by the peak regions 7A and 8A and the anode and cathode electrodes 4, 6 act as passageways for distributing fuel and oxidant process gases to the electrodes.

In accordance with the principles of the present invention, the anode compartment or portion of the fuel cell 1 is further provided with a catalyst assembly 9. As shown in FIG. 1, the catalyst assembly 9 is in the form of a sheet or plate member which contains a catalyst for reforming a hydrocarbon fuel to fuel gas for the fuel cell 1. The catalyst sheet member 9 is held by the current collector plate 7, so that solid portions of the sheet member occupy the channels 7D formed by the spacer regions 7B of the plate 7 and the separator plate 3. Hydrocarbon gas introduced into the channels 7D will thus interact with the catalyst and the steam in the channel developed by the fuel cell itself to steam reform the hydrocarbon gas to generate hydrogen fuel gas for the anode chambers 7C of the cell.

Figure 2:
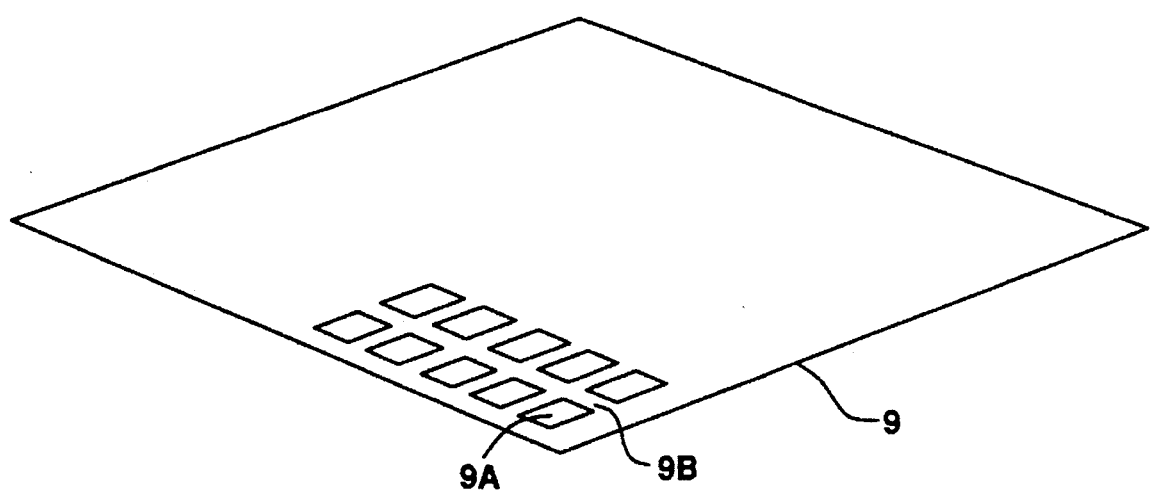
FIG. 2 shows the catalyst member of the fuel cell of FIG. 1.

FIG. 2 shows the catalyst sheet or plate member 9 in greater detail. As shown, the plate member 9 is solid in form and is provided with apertures or through openings 9A of preselected configuration and distribution. Specifically, the configuration and distribution of the apertures 9A is such that the sheet member 9 can be inserted over the current collector plate 7 so that the openings 9A pass over and around the peak regions or legs 7A of the current collector 7 and so that the solid regions 9B abut the spacer regions 7B of the current collector. The peak regions 7A of the current collector engage the sides of the openings 9A so that the catalyst sheet member 9 is securely held in position by the current collector plate 7.

Figure 3:
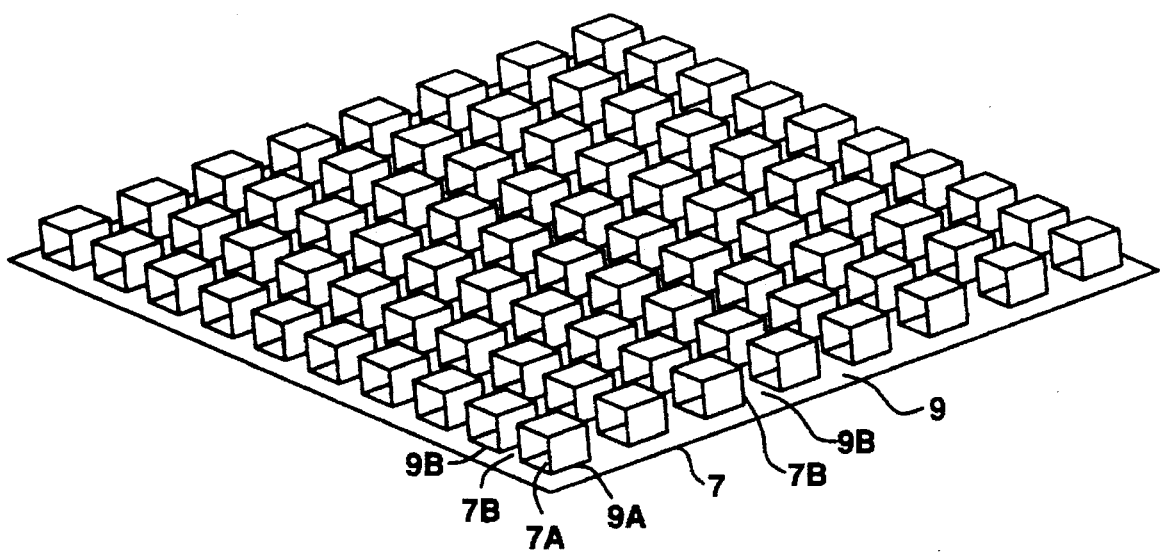
FIG. 3 shows the combination of the current collector and catalyst member of the fuel cell of FIG. 1.
Figure 4:
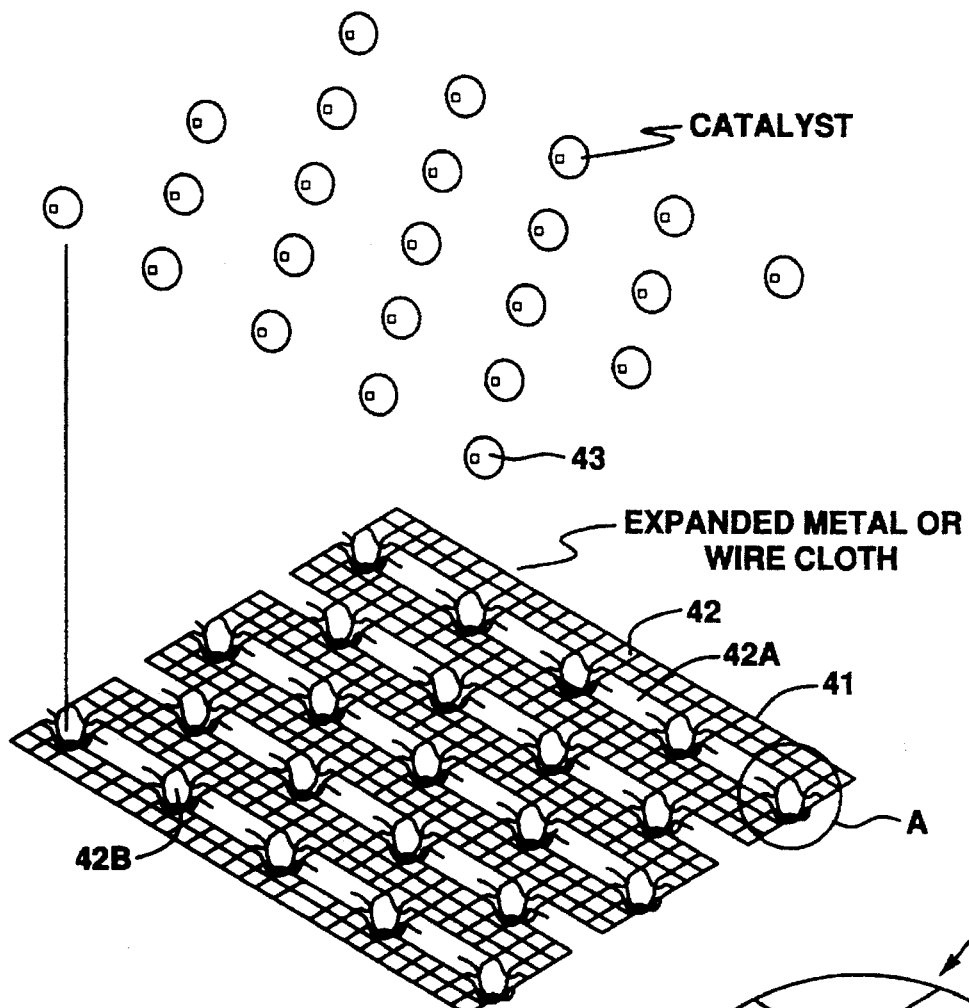
Figure 5:
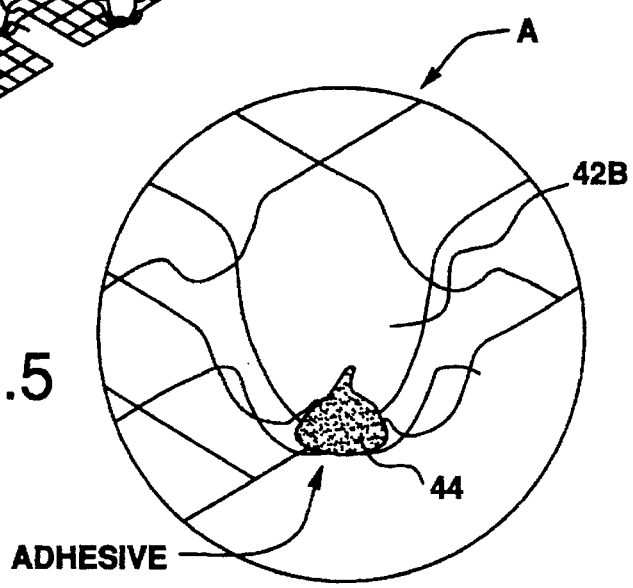
Figure 6:
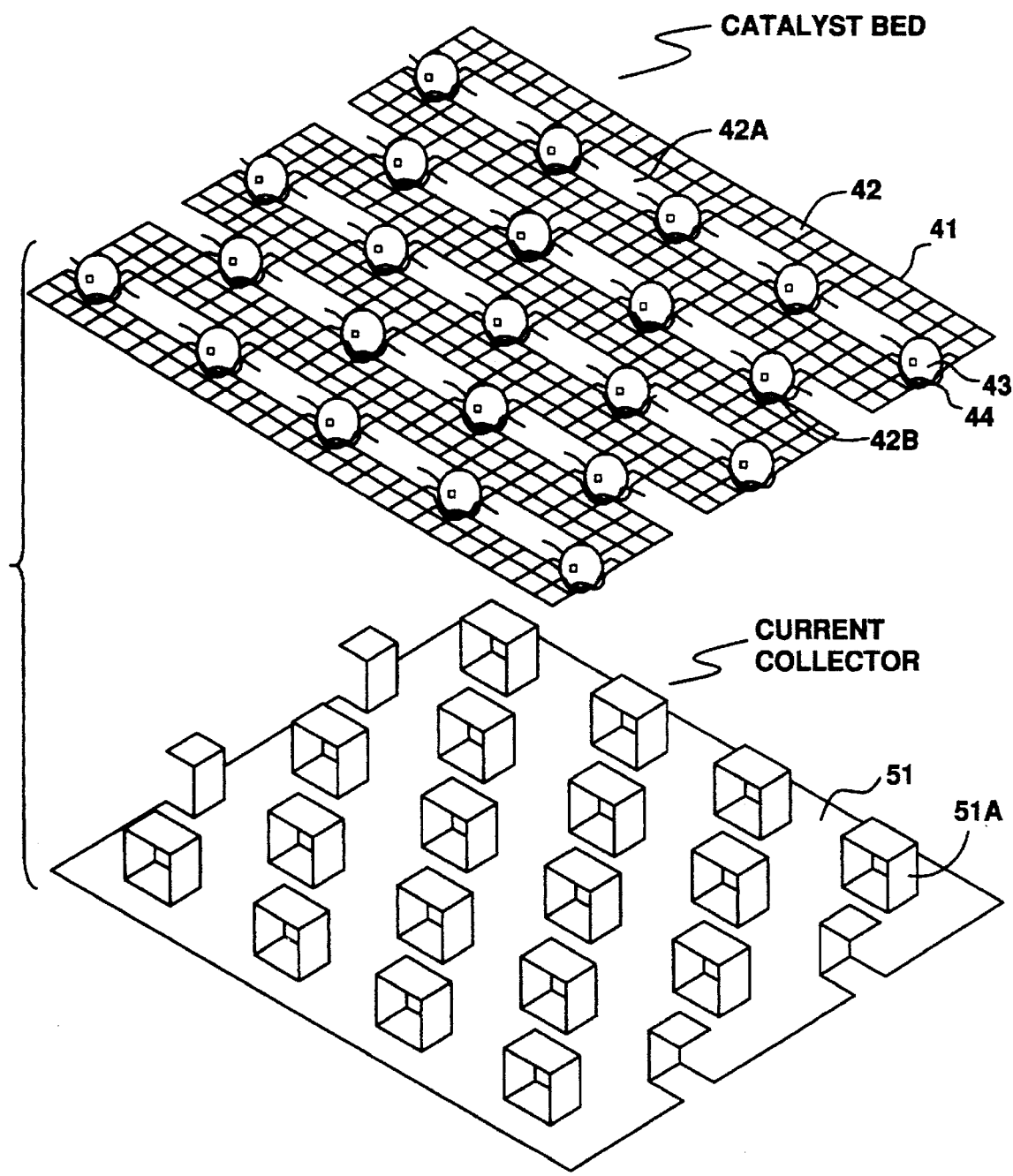

This is shown more clearly in FIG. 3 where the solid regions 9B of the sheet member 9 lie flat against the spacer regions 7B of the current collector 7 with the apertures 9A surrounding and engaged by the peak regions or legs 7A of the current collector. The sheet member 9 is thus held securely in place by the current collector and the member 9 is thus prevented from shifting or falling loose when assembled with the current collector in the fuel cell.

Assembly of the anode portion of the fuel cell can be carried out by first inserting the sheet member 9 onto the current collector 7. The assembled unit can then be inverted and the peak regions 7A of the current collector placed against the separator plate 3. The anode electrode 4 can then be placed against the spacer regions 7B of the current collector 7. Alternatively, the anode electrode 4 can be first affixed to the current collector spacer regions 7B and the catalyst assembly then inserted onto the collector.

The catalyst plate member 9 can be made from a catalyst powder by either pressure molding or extruding of a slurry. The catalyst member can also be formed by catalyzing a metallic or non-metallic plate having the desired apertured geometry. The amount of catalyst used to form the member 9 and the thickness of the member and its length and width will depend on a number of factors including the desired characteristics of the fuel cell, the assembly procedures and the catalyst manufacturing limitations.

FIGS. 4–7 show alternative embodiments of the catalyst member of the invention in which the member supports catalyst pellets. More particularly, in FIGS. 4–7, the catalyst member is shown as an expanded metal or wire screen 41 having openings 42. Certain of these openings 42A have been enlarged to receive and hold the peak regions 51A of a current collector 51 (see, FIGS. 6–7). Other of these openings 42B have been brought together so as to support catalyst pellets 43 secured thereto by adhesive 44 (see FIGS. 4–5).

The catalyst pellets 44 are shown as spherical in FIGS. 4–7 but can be any other shape, such as, for example, rod-shaped, and can also be crushed. In the case of spherical pellets, the pellets may be in the range of 20–120 mils, with a range of 60–80 mils preferred. For rod-shaped pellets, a range of 50–200 mils in length is usable, with 60 mils being preferred.

The expanded metal or wire screen 41 can be formed of nickel. Use of expanded metal for the member 41 results in lightweight and low cost, while use of a wire screen for the member 41 maximizes the separation distance. The sizes of the openings in catalyst members are required to permit requisite holding of the catalyst pellets and provide low pressure drop access to gas flows.

Two or more catalyst members 41 can be layered to provide an improved member. In particular, a multilayered structure helps increase the separation distance from the anode electrode.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A catalyst assembly for placement in the anode compartment of an internally reforming fuel cell, said anode compartment including an anode and a current collector having a plurality of peak regions with spacer regions therebetween, the spacer regions facing said anode, the catalyst assembly comprising:

a member including a catalyst material and having through openings, said through openings in said member having a distribution and configuration so that said member can be inserted over said current collector with the peak regions being received in said through openings.

2. A catalyst assembly in accordance with claim 1 wherein:

said peak regions and spacer regions of said current collector alternate in at least one direction of said current collector.

3. A catalyst assembly in accordance with claim 2 wherein:

said peak regions and said spacer regions alternate in the length and width directions of said current collector.

4. A catalyst assembly in accordance with claim 1 wherein:

said peak regions engage the walls of said through openings and hold said member when said member is inserted over said current collector.

5. A catalyst assembly in accordance with claim 1 wherein:

said member has solid regions between said through openings, said solid regions of said member abutting said spacer regions of said current collector when said member is inserted over said current collector.

6. A catalyst assembly in accordance with claim 1 wherein:

said member comprises one of a catalyzed metallic plate and a catalyzed non-metallic plate.

7. A catalyst assembly in accordance with claim 1 wherein:

said member is one of a molded and extruded catalyst material.

8. A catalyst assembly in accordance with claim 1 wherein:

said member is formed as a plate.

9. A catalyst assembly in accordance with claim 1 wherein:

said member comprises: an expanded metal having openings, certain of said openings being used to form said through openings; and catalyst pellets supported by certain of said openings other than the openings forming said through openings.

10. A catalyst assembly in accordance with claim 9 wherein:

said metal is nickel.

11. A catalyst assembly in accordance with claim 1 wherein:

said member comprises: a wire screen having openings, certain of said openings being used to form said through openings; and catalyst pellets supported by certain of said openings other than the openings forming said through openings.

12. A catalyst assembly in accordance with claim 10 wherein:

said wire screen comprises nickel.

13. A catalyst assembly in accordance with claim 1 wherein:

said catalyst is promotive of steam reforming hydrocarbons to hydrogen.

14. An internally reforming fuel cell comprising:

an anode compartment including: an anode; a separator plate; a current collector having a plurality of peak regions with spacer regions therebetween, the spacer regions and the peak regions facing said anode and said separator plate, respectively; and a catalyst assembly including a member comprising a catalyst material and having through openings, said through openings in said member having a distribution and configuration so as to be receivable by the peak regions of said current collector, said member being inserted over said current collector with the peak regions of said current collector being received in said through openings.

15. An internal reforming fuel cell in accordance with claim 14 wherein:

said peak regions and spacer regions of said current collector alternate in at least one direction of said current collector.

16. An internal reforming fuel cell in accordance with claim 15 wherein:

said peak regions and said spacer regions alternate in the length and width directions of said current collector.

17. An internal reforming fuel cell in accordance with claim 14 wherein:

said peak regions engage the walls of said through openings and hold said member.

18. An internal reforming fuel cell in accordance with claim 14 wherein:

said member has solid regions between said through openings, said solid regions of said member abutting said spacer regions of said current collector.

19. An internally reforming fuel cell in accordance with claim 14 wherein:

said, member comprises one of a catalyzed metallic plate and a catalyzed non-metallic plate.

20. An internally reforming fuel cell in accordance with claim 14 wherein:

said member is one of a molded and extruded catalyst material.

21. An internally reforming fuel cell in accordance with claim 14 wherein:

said member is formed as a thin flat plate.

22. An internally reforming fuel cell in accordance with claim 14 wherein:

said member comprises: an expanded metal having openings, certain of said openings being used to form said through openings; and catalyst pellets supported by certain of said openings other than the openings forming said through openings.

23. An internally reforming fuel cell in accordance with claim 22 wherein:

said metal is nickel.

24. An internally reforming fuel cell in accordance with claim 14 wherein:

said member comprises: a wire screen having openings, certain of said openings being used to form said through openings; and catalyst pellets supported by certain of said openings other than the openings forming said through openings.

25. An internally reforming fuel cell in accordance with claim 24, wherein:

said wire screen comprises nickel.

26. An internally reforming fuel cell in accordance with claim 14 wherein:

said catalyst is promotive of steam reforming hydrocarbons to hydrogen.

27. An internally reforming fuel cell in accordance with claim 14 further comprising:

a cathode electrode;

and an electrolyte situated between said cathode and anode electrodes.

28. An internally reforming fuel cell in accordance with claim 27 wherein:

said electrolyte is molten carbonate.

* * * * *